(12) United States Patent
Speck

(10) Patent No.: US 6,749,139 B2
(45) Date of Patent: Jun. 15, 2004

(54) ELONGATE MATERIAL STORING, TRANSPORTING, AND DISPENSING APPARATUS

(76) Inventor: John W. Speck, 37748 Meadow Hill, Northville, MI (US) 48167

( * ) Notice: Subject to any disclaimer, the term of this patent is extended or adjusted under 35 U.S.C. 154(b) by 32 days.

(21) Appl. No.: 09/966,837

(22) Filed: Sep. 28, 2001

(65) Prior Publication Data

US 2002/0017475 A1 Feb. 14, 2002

Related U.S. Application Data

(63) Continuation-in-part of application No. 09/588,845, filed on Jun. 7, 2000, now Pat. No. 6,296,118.

(51) Int. Cl.$^7$ .............................................. B65H 49/00
(52) U.S. Cl. ....................... 242/128; 242/129; 206/408
(58) Field of Search ................ 206/397, 398, 206/408, 409; 242/128, 129, 171, 172

(56) References Cited

U.S. PATENT DOCUMENTS

| | | | | |
|---|---|---|---|---|
| 2,412,178 A | * | 12/1946 | Seigh | 206/519 |
| 2,479,826 A | * | 8/1949 | Frick et al. | 242/128 |
| 3,203,642 A | * | 8/1965 | Hirst | 242/128 |
| 3,406,817 A | * | 10/1968 | Lane et al. | 206/408 |
| 3,811,639 A | * | 5/1974 | Jordan | 242/129.8 |
| 3,840,115 A | * | 10/1974 | Ladewig | 206/506 |
| 4,015,795 A | | 4/1977 | Chong | |
| 4,032,078 A | | 6/1977 | Van de Loock | |
| 4,140,289 A | | 2/1979 | Kovaleski | |
| 4,222,535 A | * | 9/1980 | Hosbein | 242/128 |
| 4,334,653 A | * | 6/1982 | Whellams | 242/129.8 |
| 4,511,037 A | | 4/1985 | Lucous | |
| 4,623,063 A | | 11/1986 | Balkin | |
| 4,967,978 A | | 11/1990 | Roberts | |
| 5,062,580 A | | 11/1991 | Meagher | |
| 5,078,269 A | | 1/1992 | Dekko et al. | |
| 5,103,977 A | | 4/1992 | Douglas | |
| 5,139,209 A | | 8/1992 | Kramer | |
| 5,154,303 A | * | 10/1992 | Jordan | 206/506 |
| 5,255,863 A | * | 10/1993 | Horndler | 242/159 |
| 5,390,790 A | | 2/1995 | Straub et al. | |
| 5,490,595 A | * | 2/1996 | Sakai et al. | 206/408 |
| 5,634,569 A | * | 6/1997 | DeCoster | 206/519 |
| 5,738,209 A | | 4/1998 | Burr et al. | |
| 5,758,834 A | * | 6/1998 | Dragoo et al. | 242/128 |
| 5,921,391 A | | 7/1999 | Oritz et al. | |

* cited by examiner

Primary Examiner—David T. Fidei
(74) Attorney, Agent, or Firm—Carrier, Blackman & Associates, P.C.; Joseph P. Carrier; William D. Blackman (57) ABSTRACT

An apparatus for storing, transporting, and dispensing elongate material, such as wire. The elongate dispensing system includes a reusable, stackable, storage container for having a substantially circular inner channel to contain a coil of elongate material and a dispensing guide having a plurality of interior guide mechanisms through which elongate material is dispensed without tangles or over-spooling. The storage container further includes a fastening system through which the dispensing guide removably engages said container during operation, ergonomic handles, and wire containment recesses which contain the ends of elongate material when the apparatus is not in operation.

16 Claims, 9 Drawing Sheets

ELONGATE MATERIAL STORING, TRANSPORTING, AND DISPENSING APPARATUS

This is a continuation in part of U.S. patent application Ser. No. 09/588,845, filed Jun. 7, 2000 now U.S. Pat. No. 6,296,118.

BACKGROUND OF THE INVENTION

1. Field of the invention

The present invention relates to storage containers for elongate materials, such as wire or cable, and methods of use thereof. More particularly, the present invention relates to a stackable, reusable storage container and interconnecting dispensing guide.

2. Description of the Background Art

Storage containers for elongate material are widely used in industrial settings. In particular, storage containers are used not only for storing elongate material such as wire, but are also used as a means by which the elongate material is fed into a machine, commonly referred to as "pay out." Both pay out and loading the elongate material into the elongate storage material containers is generally performed using the Nehoff Payout System (NPS).

With reference to storage of elongate material, existing storage containers for elongate material consist of either small reels which contain approximately 6,000 lineal feet or large reel/barrel containers which contain approximately 15,000–30,000 lineal feet of elongate material. As a result of the two distinct classifications, industrial use is confined to either a mobile small capacity container capable of being moved by hand for use in projects requiring limited amounts of elongate material or a large capacity container capable of being moved only by machine for use in projects requiring large amounts of elongate material, some of which would be discarded, leaving barrels containing amounts of elongate material otherwise unusable for another project. Additionally, most small capacity storage containers are designed for only a one-time use, while most large capacity containers provide for only limited reuse as most contain left-over elongate material.

With reference to the pay out of elongate material storage containers, either capacity elongate material container serves a the source from which the elongate material is loosely dispensed. Generally, while machines receiving the elongate material are capable of much higher rates of production, the storage containers of the elongate material require the machines to run at a substantially lower rate due to tangling and over-spooling problems associated with dispensing elongate material at higher rates of production.

Several variants of elongate material storage containers are illustrated in U.S. Pat. Nos. 5,078,269; 4,967,978; 4,140,289; and, 4,032,078.

U.S. Pat. No. 5,078,269, issued to Dekko et al, entitled, "Wire Shipping and Dispensing Container," discloses a storage container which provides for improved dispensing of elongate materials through a specialized coiling and storage method. The Dekko et al. container requires a special apparatus to be used in the winding process by which a small quantity of elongate material is strategically coiled inside the container. The container also requires another special apparatus for the shipping and dispensing of elongated material.

U.S. Pat. No. 4,967,978, issued to Roberts, entitled, "Wire Storage Reel," discloses a wire storage reel wherein a large quantity of elongate material is wound onto the storage reel while tension is placed on the outer wall of the reel. Upon completion of the material being placed on the reel, the wire may be removed as desired by rotating the storage reel in accordance with the at the rate of the desired wire dispersion.

U.S. Pat. No. 4,140,289, issued to Kovaleski, entitled, "Disposable Wire Storage and Pay-Out Spool," discloses a cylindrical threaded spool having symmetrical conical end flanges capable of being disassembled for storage purposes. The spool is threaded to provide uniform installation and removal of large amounts of elongate material from along the body of the spool.

U.S. Pat. No. 4,032,078, issued to Van de Loock, entitled, "Reel For The Storage Of Wire Or The Like," discloses a circular reel including an array of bent wire forming the containment segments of the reel. The Van de Loock invention receives and stores large quantities of elongate material along the containment segments of the reel between two circular end pieces.

In response to the problems associated with storage capacity, mobility, reuse, and high rates of dispensing material, the above-referenced patents offer various devices to resolve the a fore stated problems; however, these known devices have limitations and disadvantages associated therewith. For example, certain elongate material storage and pay out devices require the use of specialized material installation devices, while other elongate material storage containers are not reusable given the method of material installation. Further by way of example, other storage containers requires relocation via a machine due to their weight with little or no possibility of reusing the container and still require a slow rate of production to avoid tangles and over spooling.

As a result, a need still exists in the art of elongate material dispensing and storage for an apparatus that properly and cost effectively dispenses elongate material. In particular, there is a need for a easily mobile, stackable, reusable storage container and dispensing guide to avoid tangles and over-spooling and increase production.

SUMMARY OF THE INVENTION

The present invention has been developed to overcome the foregoing limitations and disadvantages of known elongate material dispensing from storage containers, and to generally fulfill a need in the art for an elongate material storage and dispensing apparatus which provides for movable, reusable and stackable containers using a standard method of loading and pay out as well as minimizing tangles and over-spooling associated with high rates of dispensing.

An elongate material dispensing system, in accordance with the present invention includes a stackable, reusable storage container including outer and inner walls so as to define a substantially circular channel therebetween for storing elongate material and a dispensing guide supported by the container to prevent tangles and over-spooling as the elongate material is dispensed from the container.

Accordingly it is an object of the present invention to provide a fastening mechanism which removably secures the dispensing guide to the container. The fastening mechanism is situated at the lower portion of the dispensing guide and is removably received by at least one aperture within a wall of the container so as to enable one dispensing guide to accommodate multiple containers consecutively.

Another object of the present invention is to provide a dispensing guide including a main body, the lower portion of which includes the fastening mechanism and a cover which when fully assembled, creates a channel between the conically shaped interior of the cover and the main body, also conical in shape, through which the elongate material travels as it is dispensed from the substantially circular channel of the container.

Yet another object of the invention is to provide a dispensing system including multiple flexible projections extending from either the main body or the cover, located between the main body and cover which further guide the elongate material from the container through the dispensing channel during operation.

Still another object of the invention is to provide a dispensing system wherein at least one of the inner and outer walls of said container include a means by which a plurality of containers may be stacked in a nesting configuration. The nesting configuration varies depending on whether the container contain elongate material, as at least one of the inner and outer walls include a means for nesting containers when full or empty.

Still another object of the present invention is to provide a container for storing, transporting, and dispensing elongate materials including an outer wall portion, an inner wall portion concentrically located within said outer wall portion connected together by a bottom wall portion such that a substantially circular channel is created for storing a coil of elongate material. At least one of the inner and outer walls containing a means of supporting an identical container thereon in a nesting configuration and at least one recess to secure the end of the elongate material when not being dispensed.

Still another object of the present invention is to provide a container with a means for receiving the engaging a fastening mechanism of a dispensing guide within at least one of said inner and outer wall portions. The means may operatively comprise of an aperture or hole for releasably engaging a protrusion within said fastening mechanism.

Still another object of the present invention is to provide a dispensing guide for directing elongate material from a container to a machine to prevent tangles and over-spooling. A dispensing guide according to the present invention includes a main body having upper and lower portions with tapered outer surfaces, each tapering away from the center of said main body, a cover having a substantially conical shaped inner surface and an aperture at the upper most section of said cover, and a fastening mechanism including at least one projection along the bottom portion of said main body. Said fastening mechanism cooperatively engages an aperture of an elongate storage container.

Still anther object of the present invention is to provide a dispensing channel between the interior surface of said cover and the outer surface of said main body when said cover is operatively placed over said main body. Extending outward from at least one of said man body and said cover are a plurality of flexible projections which further direct elongate material from the container and through the dispensing channel.

Still another object of the present invention is to provide an engagement means between said cover and a container whereby said cover is prevented from rotating during the dispensing of elongate material.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Referring to FIGS. 1–8, a first embodiment of the present embodiment of the elongate material storage container and pay out guide apparatus is shown generally at 100. Specifically referring to FIGS. 1 and 2, the apparatus includes a storage container section 200 constructed from an injection molded plastic; however, alternative methods of construction and material may be used which possess characteristics and properties similar to that of the method and materials of the preferred embodiment; such methods and materials may include cast molding and various polymers.

Figure 1:
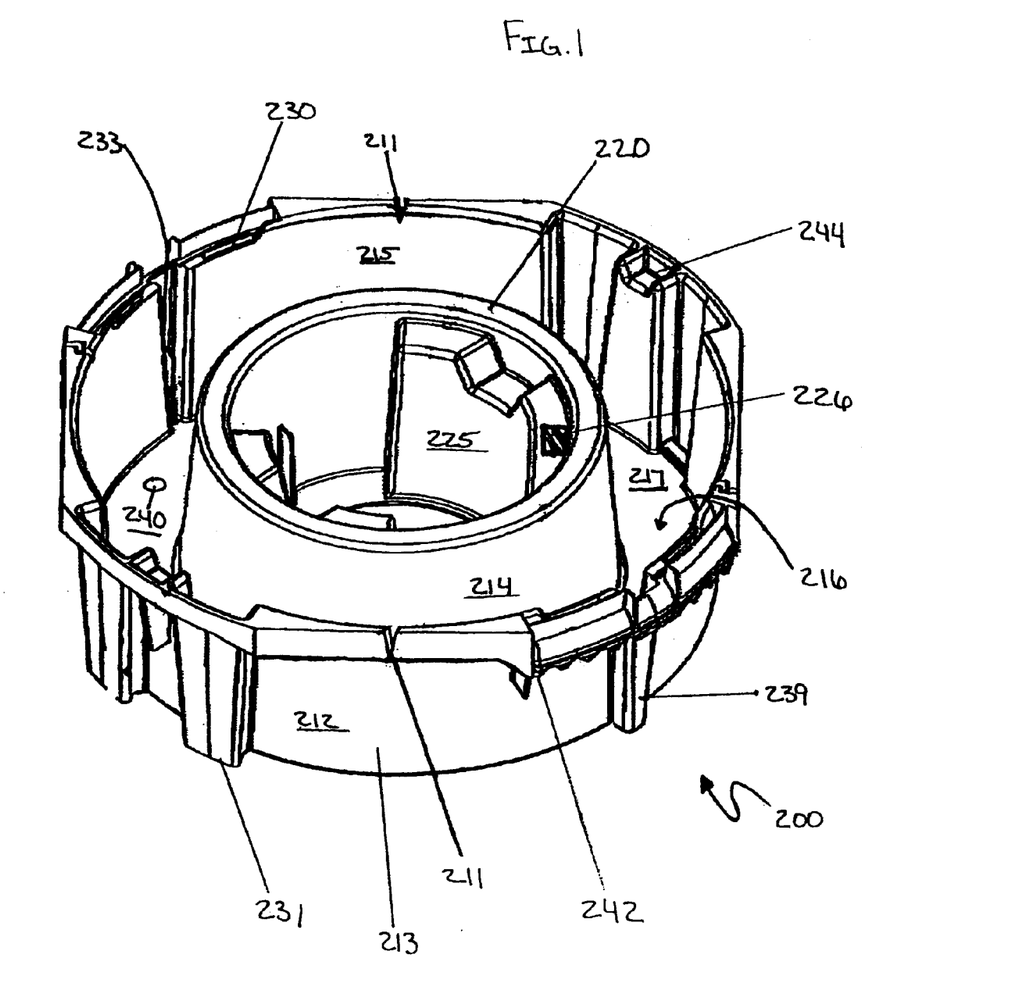
FIG. 1 is a top perspective view of a the stackable, reusable, elongate material storage container in accordance with the preferred embodiment of the invention.
Figure 2:
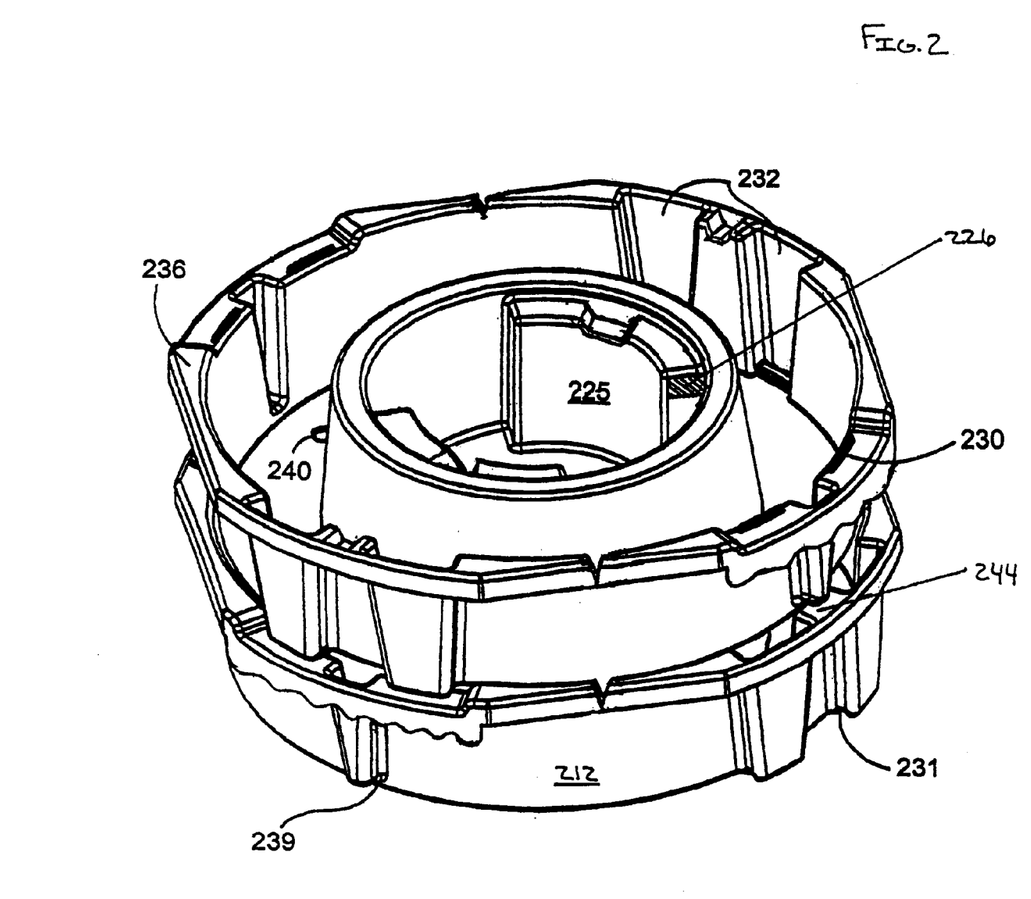
FIG. 2 is a top perspective view two elongate storage containers in a stacked configuration in accordance with the preferred embodiment of the invention.
Figure 3:
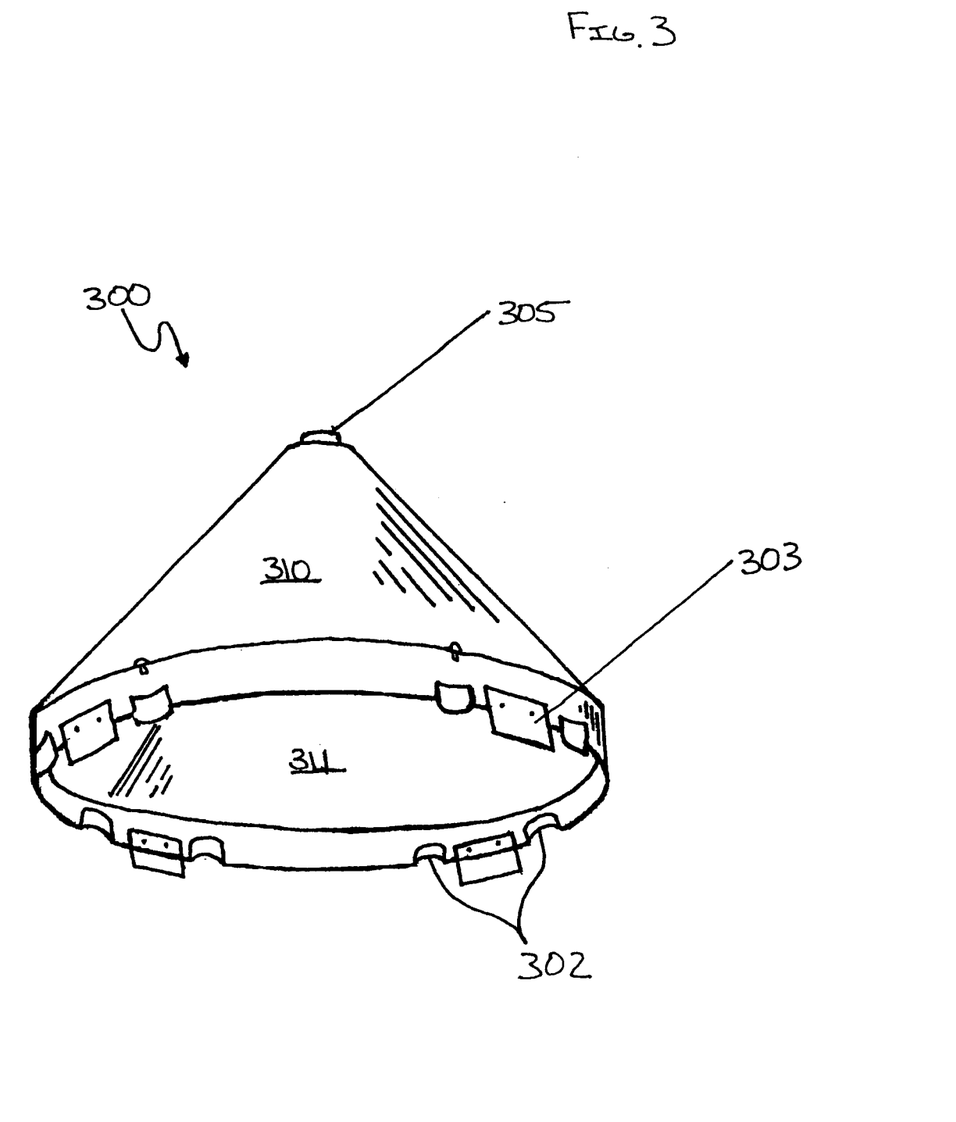
FIG. 3 is a bottom perspective view of the pay out guide cap in accordance with the preferred embodiment of the invention.

The storage channel 216, located between the interior section 215 of the sidewall 213 and outer section 214 of the pay out base guide 220 houses the elongate material during loading, storing, and dispensing. The storage container 200 further includes a floor 217 equipped with drainage holes 240 for removal of debris or liquid which may fall into the internal storage channel 216. Alternatively, the floor 217 may be constructed either completely void of drainage holes 240 or entirely in a grate-like manner.

The exterior wall 212 of the storage container 200 which surrounds the storage channel 216 tapers inwardly toward the bottom so as to be easily stacked in variable nesting configurations. Specifically referencing FIGS. 1 and 2, the exterior wall 212 includes one multistacking system for occasion when the storage channel 216 contains elongate material and another when the storage channel 216 is empty. When the storage channel 216 contains elongate material the containers are stacked on top of one another so as to prevent damage to the elongate material (See FIG. 2). Specifically, the protrusions 231 and 239 molded with in the exterior wall 212 interconnect with the tabs 230 and indentations 244, respectively, within the lip 236 of the exterior wall 212. As shown in FIGS. 1 and 2 the lip 236 of the exterior wall 212 is polygonal in shape; however, as an alternative, the shape of the lip 236 may be molded into any shape (octagonal, square, oval, etc.) so long as portions of the lip 236 accommodate the securement tabs 303 of the guide cover 300 (See FIG. 3). When the storage channel 216 is empty, the storage container 200 may be stacked in a more compact configuration through the protrusions 231 and 239 engaging the depressions 232 and 233, respectively, within the interior portion 215 of the exterior side wall 212. Use of either stacking system is advantageous as the stacked, compact nature not only reduces shipping costs but also maintains that the stored elongate material remains in the containers during shipping. While the elongate material storage container 200 utilizes a dual system of stacking, a single system may alternatively employed, as well as a alternative system entirely, such as a hook and eye system.

Additionally, the exterior wall 212 of the storage container 200 further includes various features designed to assist the user. As referenced by number 211, the upper section of the exterior wall 212 includes slots 211 wherein the ends of the elongate material may be placed to assist the user in locating the end of the material. Further, the upper section of the exterior wall 212 includes handles 242 for ease in shipping and moving the container 200. As shown in various figures, specifically referencing FIG. 1, the handles 242 are illustrated with contoured finger grips; however, the handles may alternatively not include individual finger grips or may be constructed in an alternate manner such as handle extending outwardly from the exterior wall 212.

Additionally referring to FIGS. 1 and 2, the elongate material storage container 200 includes a pay out base guide 220, centrally located within the interior of the elongate material storage container 200. The base guide 220 includes a sidewall 214 which also serves to contain elongate material within the storage channel 216, support stands 225, and receiving apertures 226. The base guide 220 supports and interlocks the elongate storage container 200 to the pay out stand (See FIGS. 3–8).

Specifically referring to FIGS. 3–8, the pay out section of the apparatus 100 encompasses four main components: the cover 300; the connecting assembly 410, the upper guide 420 and lower guide/locking assembly 430. The main body 310 of the cover 300, according to the preferred embodiment of is constructed from an injection molded plastic; however, the main body 310 may alternatively be constructed from any other plastic or polymer or by some means other than injection molding which would provide properties and characteristics similar to that of the preferred embodiment. Further, although the main body 310 is shown substantially conical in shape, the exterior surface of the main body 310 may alternatively be square or cylindrical in shape, so long as the interior surface 311 of the main body 310 remain conical as required to guide elongate material.

Figure 7:
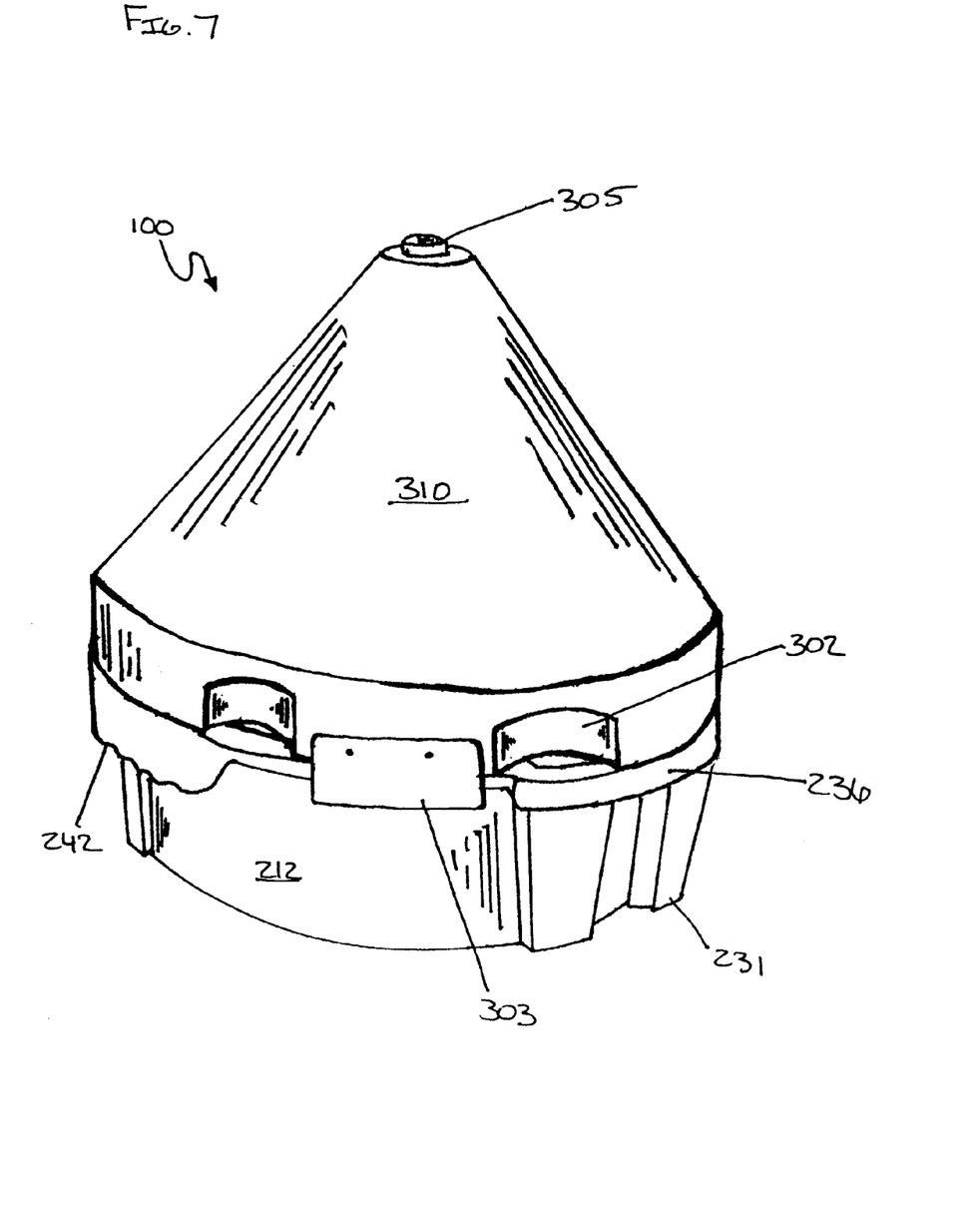
FIG. 7 is a perspective view of the apparatus, fully assembled in accordance with the preferred embodiment of the invention.

Located along the lower edge of the cover 300 are depressions 302 within the main body 310 and which are located on either side of the placement tabs 303 which secure the cover to the elongate storage container 200 (See FIG. 7). Positioned on the top of the main body 310 is a rotatable collar 305 through which the elongate material is removed. The rotatable collar 305 is constructed of Teflon® and alternatively may be constructed of hardened plastic or other material similar to the properties and characteristics of the preferred embodiment.

Further referring to FIGS. 3–8 the pay out guide 400 (shown assembled in FIG. 4) may be divided into its three remaining components 410, 420, and 430. The connecting assembly 410 includes a handle 402, stopper 404, elongate member 406, partially threaded at the end 407 opposing the handle 402, and standard threaded nuts 408 and 409. The connecting assembly 410 removably affixes the upper guide 420 to the lower guide/locking assembly 430 through placing the elongate bar 406 through the upper guide 420 and lower guide/locking assembly 430 and securing the standard nut 409 to the threaded section 407 of the elongate member 406. The upper guide is conical, similar shape and construction to the cap 300; although slightly smaller in scale.

Figure 4:
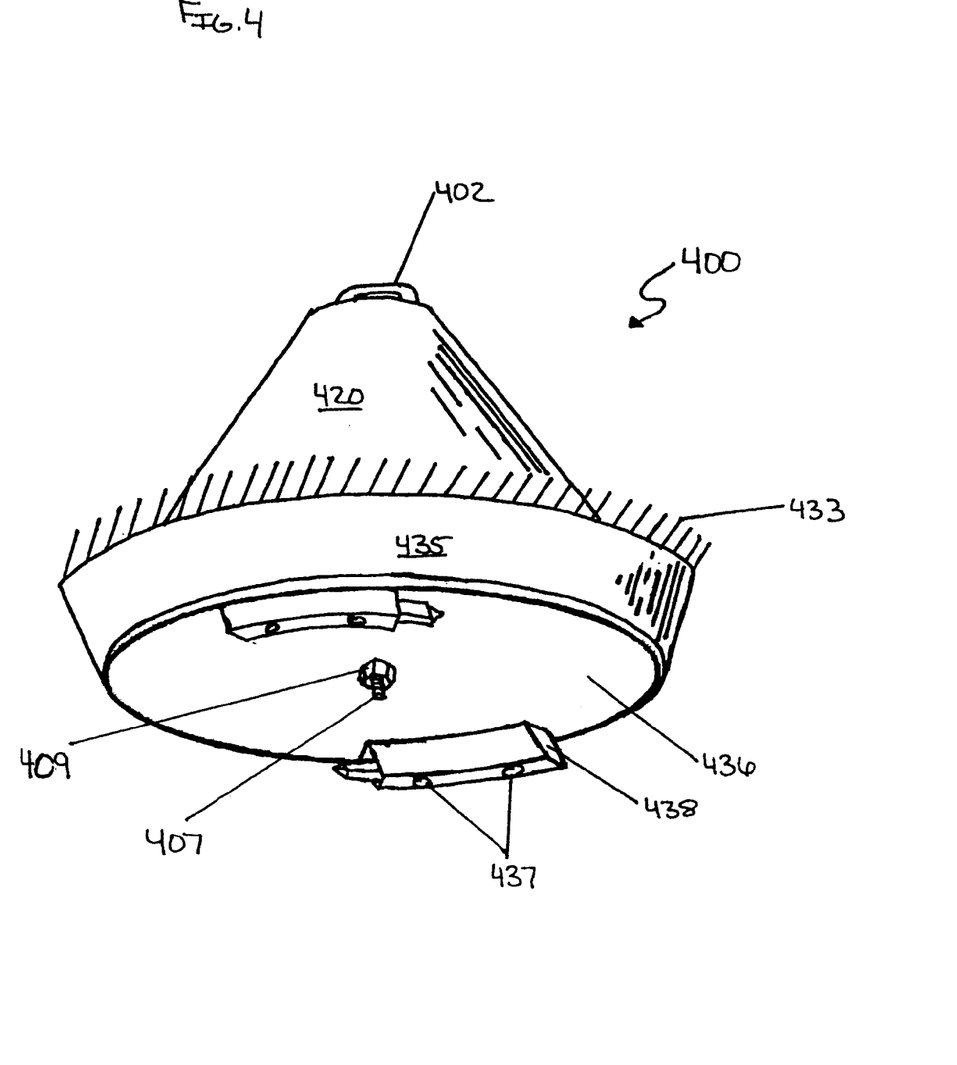
FIG. 4 is a bottom perspective view of the pay out guide in accordance with the preferred embodiment of the invention.
Figure 4A:
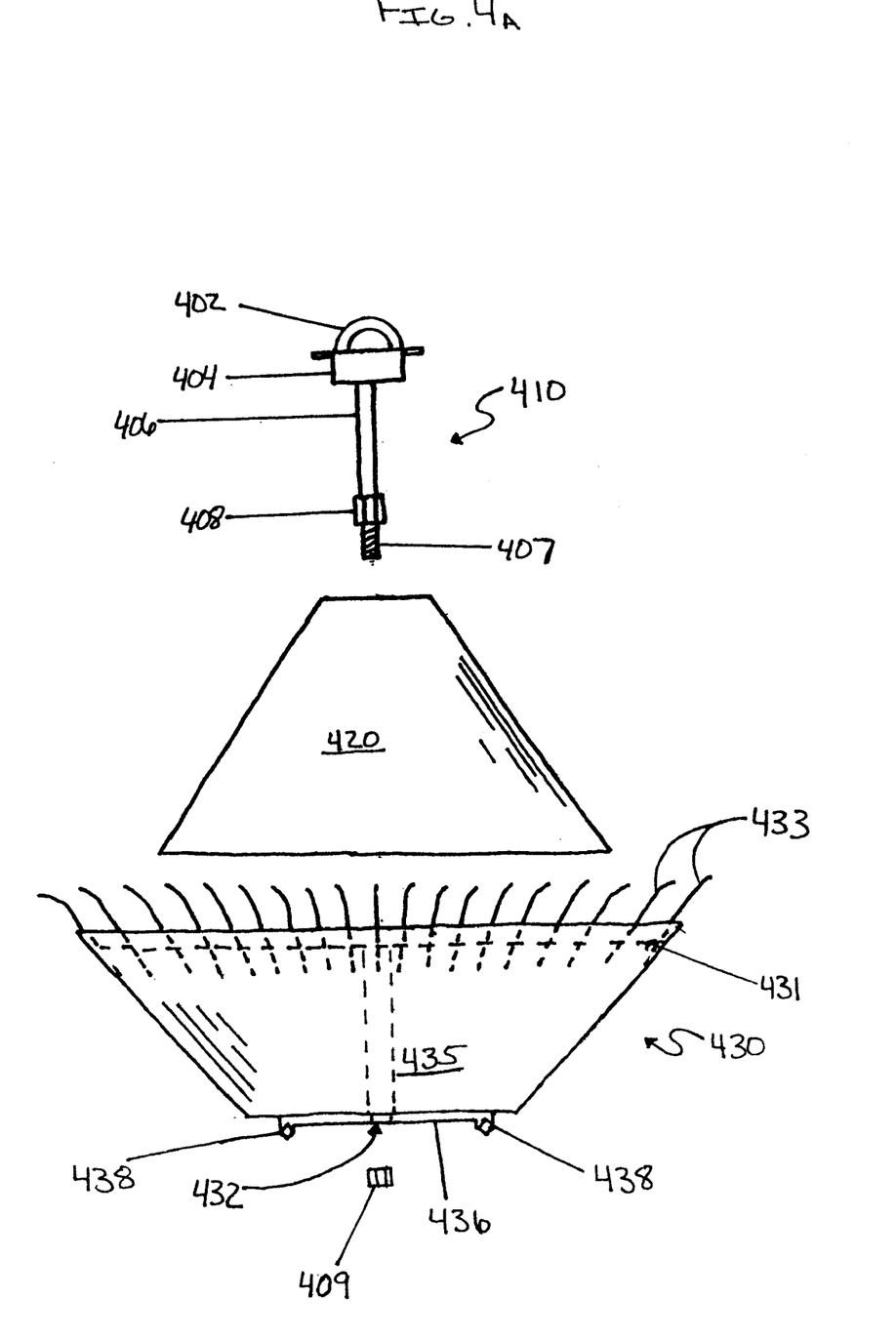
FIG. 4a is an exploded view of the pay out guide in accordance with the preferred embodiment of the invention.
Figure 5:
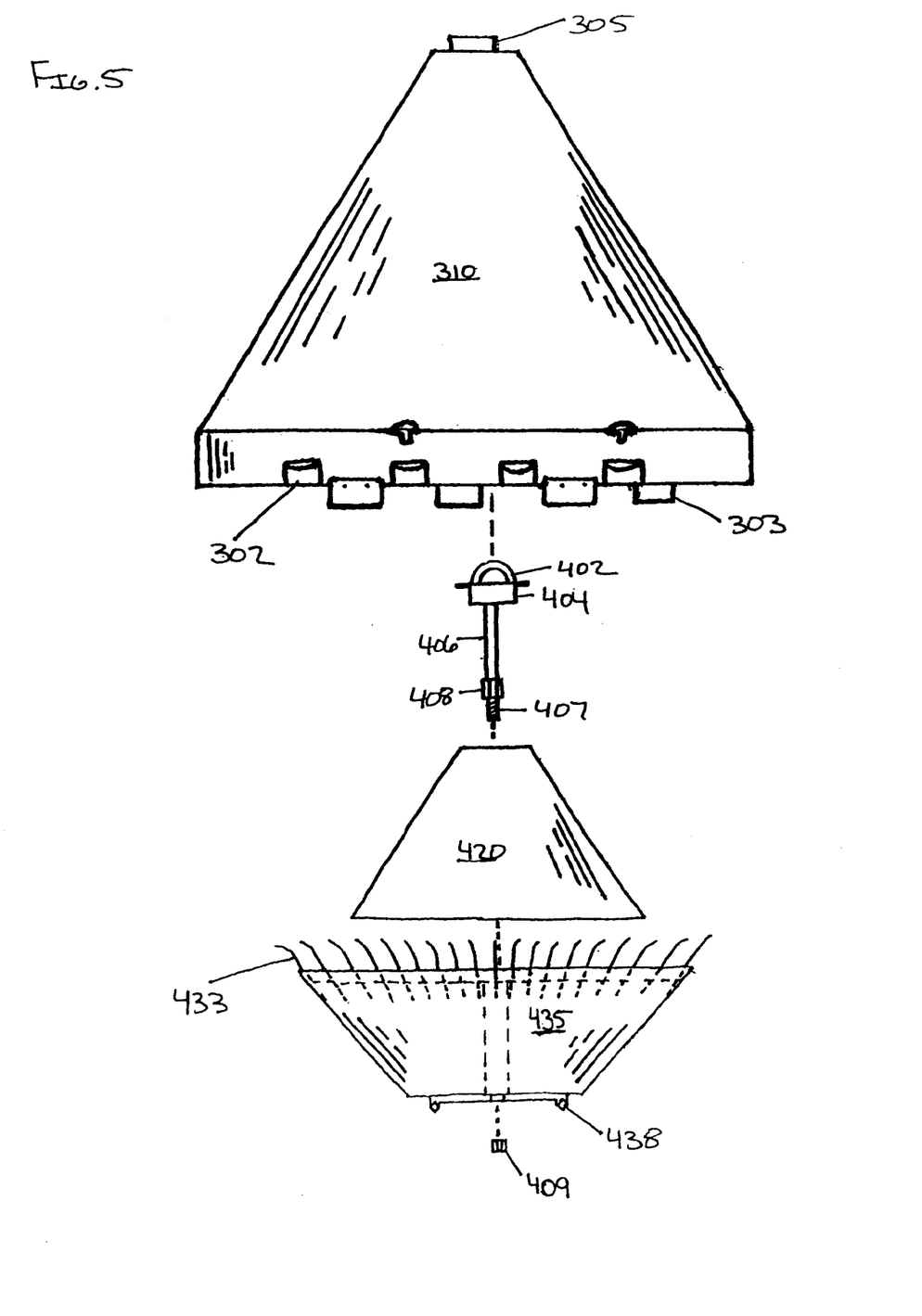
FIG. 5 is illustrative of the assembly procedure for the pay out guide and cover.
Figure 6:
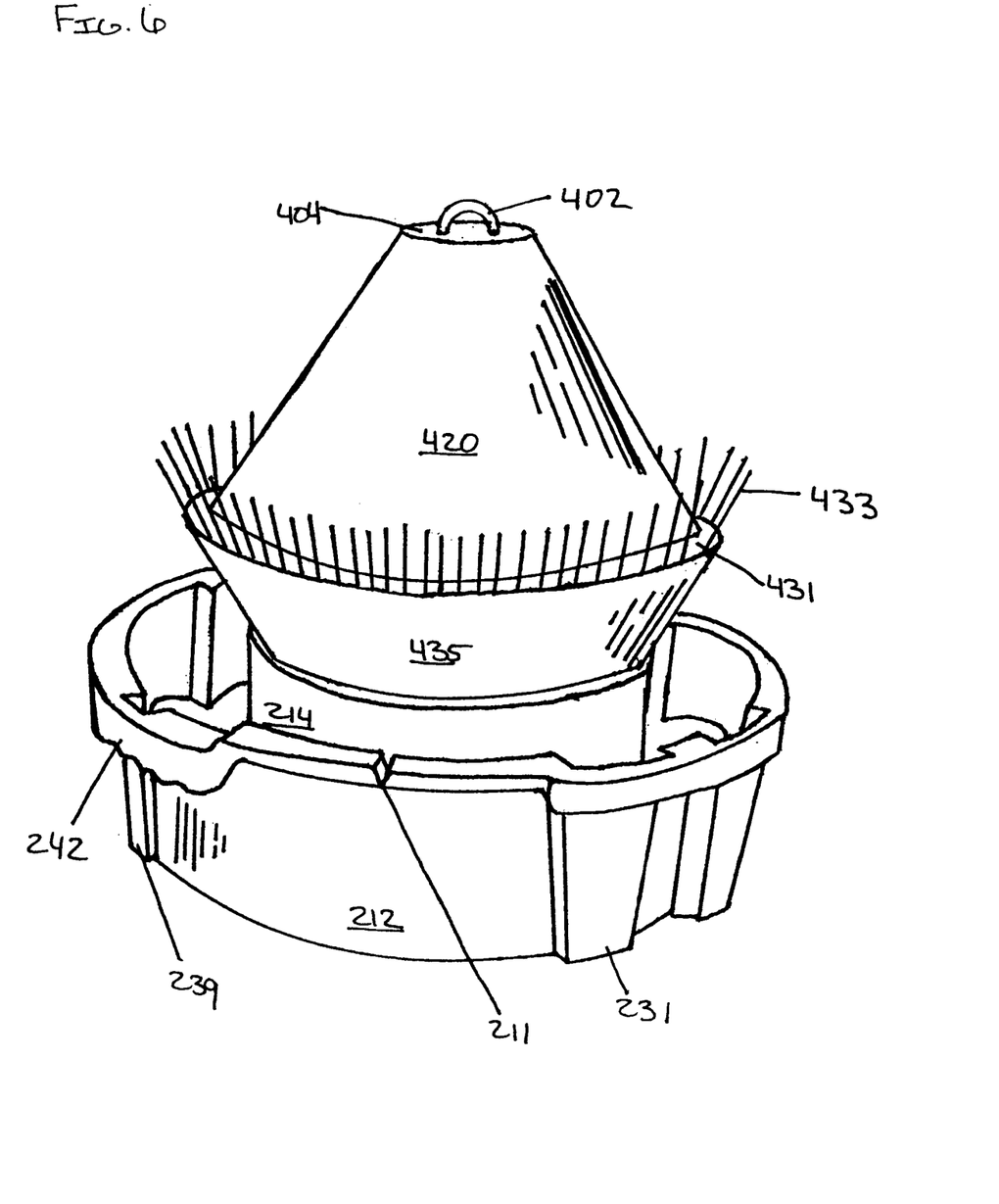
FIG. 6 is a perspective view of the pay out guide as interlocked with the elongate storage container in accordance with the preferred embodiment of the invention.

The lower guide/locking assembly 430 includes a main body 435, recessed platform 431, flexible extensions 433, internal channel 432, base 436 and interlocking devices 438. The main body 435 of the lower guide/locking assembly 430 is conically shaped and constructed from material similar to that of the upper guide 420. As depicted in FIGS. 4–6, the lower guide/locking assembly 430 is slightly larger in diameter than the upper guide 420 and the larger end of the upper guide 420 engages the recessed platform 431 of the lower guide/locking assembly 430. The flexible extensions 433 extend upward and outward from the large end of the lower guide/locking assembly 430. The flexible extensions 433 are constructed from flexible nylon; however, alternative materials with properties similar to that of flexible nylon, such as rubber or the like may also be implemented. The base 436 and interlocking devices 438 are constructed from Teflon® or other similar material which may alternatively be constructed from a hardened material such as a plastic or polymer. The interlocking devices 438 are positioned slightly inward from the outer diameter of the smaller end of the lower guide/locking assembly 435 which is completely covered by the base 436, while the interlocking devices 438 are secured to the base 436 by standard screws 437.

The pay out stand 400 is ultimately assembled securing the standard threaded nut 409 to the threaded section 407 of the elongate member 406 after passing through the internal channel 432 and through the base 436. As the pay out stand 400 is secured to the elongate storage container 200 the base 436 rests along the top of the sidewall 214 and engaging devices 438 are positioned between the support stands 225 and engage the receiving portals 226 by rotating the pay out stand 400 clockwise.

Figure 8:
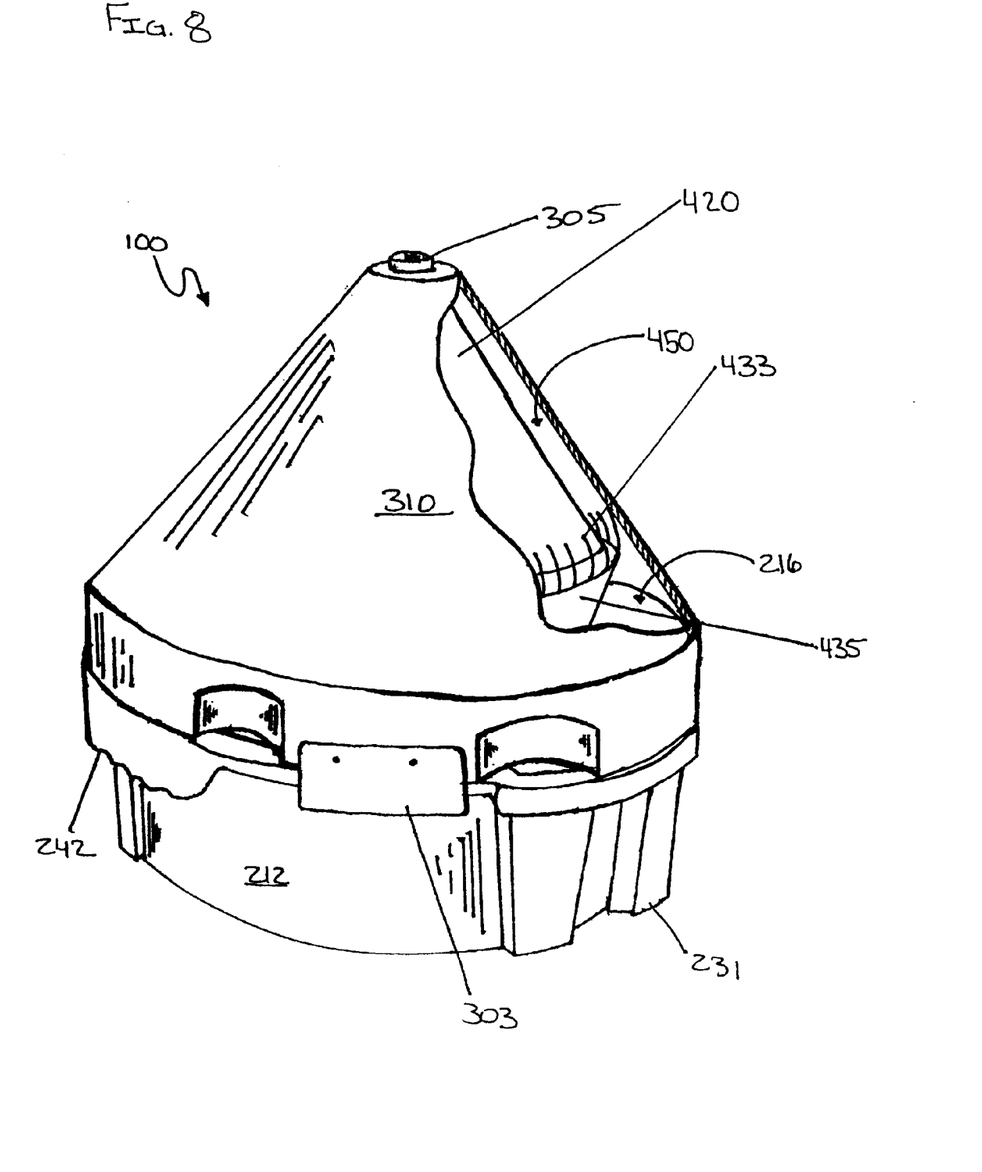
FIG. 8 is a cut-away view of the fully assembled apparatus.

Specifically referencing FIGS. 7 and 8, the apparatus 100 is fully assembled when the cover 300 is placed over the pay out stand 400 and is resting on the top 236 of the exterior wall 212 between the molded grips 242 the protrusions 231 of the exterior wall 212. Referring to FIG. 8, the apparatus 100 is shown in cut-away view so as to clearly illustrate the function of the apparatus 100. The elongate material is stored in the storage channel 216 as it is dispensed during payout the elongate material extends upward as directed by the lower guide 435. The flexible extensions 433 engage the interior surface 311 of the main body 310, causing the extensions 433 to flex. The elongate material engages the flexible extensions 433 and is thereby directed into the dispensing channel 450 and is then routed out of the apparatus 100 through the rotatable collar 305.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A dispensing system for elongate material comprising:
   a container including an outer wall portion, an inner wall portion located concentrically within the outer wall portion, and a bottom wall portion interconnecting the lower ends of the inner and outer wall portions so as to define an endless channel therebetween for storing a coil of elongate material therein, an upper surface of said container being open above said channel;

a dispensing guide which is supported on an upper surface of said container and operatively cooperates with said container to substantially prevent a coil of elongate material stored in the endless channel of said container from becoming entangled when the elongate material is dispensed from the container through the upper opening above said channel, said dispensing guide including a main body which comprises a lower guide having a base for resting on said container and a flared upper end which is wider than said base, and an upper guide having a lower end which fits inside of said flared upper end of said lower guide; and, a fastening mechanism which selectively fixes said dispensing guide onto said container.

2. The dispensing system according to claim 1, wherein said fastening mechanism includes a locking projection on said base of said lower guide and a mating recess provided in one of said outer wall portion and said inner wall portion for receiving said locking projection.

3. The dispensing system according to claim 1, wherein said dispensing guide comprises a cover which is disposable over said container and said main body to define a dispensing channel between an inner surface of said cover and an outer surface of said main body.

4. The dispensing system according to claim 3, wherein each of said upper guide and said cover of said dispensing guide is substantially conical in shape.

5. The dispensing system according to claim 3, wherein said dispensing channel communicates with and extends upwardly from said endless channel.

6. The dispensing system according to claim 3, wherein said dispensing guide further comprises a plurality of flexible projections provided on at least one of said main body and said cover and extending between said main body and said cover.

7. The dispensing system according to claim 3, wherein said cover of said dispensing guide engages said container such that said cover cannot rotate relative to said container during a dispensing operation.

8. The dispensing system for elongate material according to claim 1, wherein said fastening mechanism selectively fixes said dispensing guide on to an upper end of said inner wall portion of said container.

9. The dispensing system for elongate material according to claim 1, further comprising support structure provided within at least one of said inner and outer wall portions for securely supporting an identical second container thereon when the second container is in a rotatively aligned stacking configuration with the first container, and for compactly receiving the second container in the endless channel when the second container is in a rotatively aligned nesting configuration with the first container.

10. The dispensing apparatus for elongate material according to claim 1, wherein said inner wall portion is substantially cylindrical and slopingly tapers from a larger diameter and a lower end thereof to an upper end thereof, such that a width of said channel slopingly increases, extending upwardly from said container bottom.

11. A dispensing system for elongate material comprising:

a container including an outer wall portion, an inner wall portion located concentrically within the outer wall portion, and a bottom wall portion interconnecting the lower ends of the inner and outer wall portions so as to define an endless channel therebetween for storing a coil of elongate material therein, an upper surface of said container being open above said channel;

a dispensing guide which is supportable on an upper surface of said container and operatively cooperates with said container to guide movement of said elongate material as said material is dispensed from the container; and, a fastening mechanism which selectively fixes said dispensing guide onto said container;

wherein said dispensing guide comprises a main body which is fixable in relation to said container by said fastening mechanism, and a removable cover for placement over said container and said main body to define a dispensing channel between an inner surface of said cover and an outer surface of said main body, and further wherein said main body of said dispensing guide has a lower portion with a tapered outer surface disposed above said endless channel defined in said container and tapering narrower toward said endless channel, and an upper portion with a tapered outer surface, tapering narrower away from said endless channel.

12. A guide for dispensing elongate material comprising:

a main body having upper and lower portions with tapered outer surfaces, each tapering narrower away from the center of said main body;

a cover having a substantially conical shaped inner surface and an apeture along the uppermost portion of said cover, and;

a fastening mechanism having at least one locking projection on a bottom portion of said main body.

13. The dispensing guide according to claim 12, wherein said cover is selectively disposable over said main body to define a dispensing channel between an inner surface of said cover and an outer surface of said main body which cooperatively operates with the aperture of said cover during operation.

14. The dispensing guide according to claim 12, wherein said dispensing guide further comprises a plurality of flexible projections provided on at least one of said main body and said cover and extending between said main body and said cover.

15. The dispensing guide according to claim 12, wherein said cover engages said container so as to prevent rotation of said guide during operation.

16. The dispensing guide according to claim 15, wherein said cover further includes at least one engaging tab to prevent rotation during operation.

* * * * *